3,795,712
ALKYLATION OF HYDROCARBONS WITH OLEFINS IN THE PRESENCE OF AN ACID CATALYST

Bernard Torck, Chatou, Georges Vidouta, Neuilly-sur-Seine, Pierre Pariot, Colombes, and Michel Hellin, Andresy, France, assignors to Institut Francais des Petrole, des Carburants et Lubrifiants, Rueil Malmaison, France No Drawing. Original application Nov. 13, 1970, Ser. No. 89,462, now abandoned. Divided and this application Aug. 1, 1972, Ser. No. 277,083
Claims priority, application France, Nov. 24, 1969, 6940466
Int. Cl. C07c 3/54
U.S. Cl. 260—671 C          10 Claims

ABSTRACT OF THE DISCLOSURE

For alkylating an aromatic or aliphatic hydrocarbon with an olefin, there are employed liquid catalyst compositions containing, optionally in an inert hydrocarbon solvent, a Lewis acid or a Brönsted acid and a sulfone of formula R—$SO_2$—R′, wherein R and R′ are each separately a monovalent radical containing from 1 to 8 carbon atoms or form together a divalent radical having from 3 to 12 carbon atoms, the acid concentration being at least $10^{-5}$ moles per liter of sulfone and at most the saturation concentration without exceeding 5 moles per liter of sulfone.

---

This is a division of application Ser. No. 89,462, filed Nov. 13, 1970 and now abandoned.

This invention relates to new acid catalyst compositions and their use in such reactions as oligomerization and polymerization of unsaturated hydrocarbons, alkylation of aliphatic and aromatic hydrocarbons by means of unsaturated hydrocarbons, isomerization of saturated or unsaturated hydrocarbons, dismutation or transalkylation of aromatic hydrocarbons, selective extraction of unsaturated hydrocarbons and more generally any process carried out in the presence of catalysts of the Friedel and Crafts type.

Up to now these reactions have been carried out either in the liquid phase, in the presence of a strong inorganic acid such as concentrated sulfuric acid, anhydrous hydrofluoric acid with or without addition of a Lewis acid such as $BF_3$ or $SbF_5$, or in the presence of aluminum chloride, or in the vapor phase in the presence of solid acid catalysts of the solid phosphoric acid typs. In both cases, the catalysts suffer from the major drawback of being consumed in substantial amounts with respect to the formed alkylates. Thus, in the liquid phase, there are formed acid muds by reaction of the feed with the catalyst. These acid muds, which are insoluble, are quickly deactivated, and this results in a loss of catalyst which may reach, in the case of sulfuric acid, up to 10% by weight of the produced alkylate.

These acid muds further constitute a catalyst the catalytic activity of which cannot be controlled easily. In the vapor phase, the solid phosphoric acids are quickly deactivated and desegregated. They must therefore be replaced after relatively short periods of use.

The acid catalyst compositions of this invention do not suffer, or only in a reduced manner, from such inconveniences. These catalyst compositions are constituted by known acid catalysts, conventionally used for carrying out such reactions, in solution in a solvent consisting of a sulfone or a sulfone mixture. The solubilization of these catalysts in solvents such as sulfones offers the advantage of producing very acid solutions at relatively low concentrations. By way of example, when sulfuric acid is dissolved in tetramethylene sulfone, in a proportion of 5% by weight, there is obtained a solution the acidity of which is similar to that of a mixture of water and sulfuric acid having a 60% by weight content of the latter. Besides, the Bronsted and Lewis acids are generally very soluble in these solvents and this results in the formation of a low amount of acid muds and accordingly in an increased lifetime of the catalyst dissolved therein. Finally, the fact that there is obtained a perfectly homogeneous solution is a very significant advantage for controlling the activity of the catalyst.

It is known that these sulfones are good solvents for the aromatic hydrocarbons, but they are bad solvents for aliphatic hydrocarbons, and there is accordingly an advantage in the use of acid catalytic solutions in two liquid phases systems for continuous industrial operations. The catalyst compositions according to the invention are particularly suitable for the manufacture of hydrocarbons of high antiknock characteristics, either by alkylation of aromatic hydrocarbons by means of olefins, or by polymerization of olefins, or by alkylation of olefins with isobutane. The alkylation of aromatic hydrocarbons may also be carried out by means of these catalyst compositions for obtaining a number of compounds which may be used as bases for manufacturing detergents, resins, polymers and plastic materials. The alkylating agents are olefins such as ethylene, propylene, dodecane, propylene tetramer, hexene dimer or any other olefin or olefin cut such as those mentioned hereunder, and alkyl halides such as secondary butyl chloride and tertiary butyl chloride.

The order of reactivity of the unsaturated aliphatic hydrocarbons is as follows:

tertiary>secondary>primary.

As a result thereof the catalyst composition is perfectly adapted to the selective extraction of tertiary olefins from an olefin mixture. This catalyst composition may thus be used for example, for selectively extracting isobutene from a steam cracking $C_4$ cut and methylbutenes from a steam cracking $C_5$ cut.

In view of the very low solubility of the aliphatic hydrocarbons in such catalytic solutions, the olefinic hydrocarbons are converted to oligomers having an oligomerization degree which may be adjusted at will as a function of the operating conditions. The higher the oligomerization degree, the greater the settling of the oligomer.

The oligomerization degree may be adjusted by acting on various parameters such as the reaction temperature, the contact time, the acid concentration or the extraction by a third solvent insoluble in the sulfones such as for example cyclohexane or any other aliphatic, cyclic or alicyclic saturated hydrocarbon which cannot react. It is thus possible, in many cases, to selectively produce the olefin dimer. By way of example, the use of a third solvent or of a small concentration of acid catalyst favors the dimer formation. However it is also possible to convert the olefins to higher oligomers which may constitute oil additives or which can be used as a base for the synthesis thereof, for example by increasing the contact time.

As far as the alkylation or aromatic hydrocarbons by means of olefins is concerned, the selectivity to monoalkylates is the higher as the molecular weight of the olefin is the higher. It can be seen from the following Examples 20, 21 and 22 relating to the alkylation of benzene by means of propylene, that the selectivity is relatively small due to the formation, during the course of the reaction, not only of the di-, tri- and tetraisopropylbenzenes, but also of propylene oligomers. On the contrary, when the olefin has a relatively high molecular weight, the alkylbenzene selectivity is very high and the secondary reaction of olefin oligomerization is practically negligible (Examples 23 and 24).

The olefins which are particularly suitable for alkylating aromatic hydrocarbons are linear or branched olefins containing from 9 to 15 carbon atoms and preferably from 10 to 14 carbon atoms. There will be particularly mentioned 1-decene, 1-dodecene, olefins industrial cuts produced for example by dehydrogenating linear paraffins or cracking paraffins. When alkylating aromatics by means of olefins, the olefin concentration is generally maintained lower than 0.2 mole per liter of sulfone and the concentration of aromatic hydrocarbons lower than 60% by weight per liter of sulfone.

However these concentration conditions are by no way limitative.

The catalysts which may be dissolved in the sulfones for obtaining these catalyst compositions, are either Bronsted acids, such as, for example, sulfuric acid, fluorosulfuric acid, the sulfonic acids of the R—SO$_3$H type in which R is an alkyl group, an aromatic group or a halogenated alkyl or aromatic group, the hydrogen halides, the acids of the formula $X_nPO_2H(OR)_{2-n}$ wherein X is a halogen, R is either H or an alkyl group and $n$ is 0, 1 or 2, or $CX_nH_{3-n}COOH$ wherein X is a halogen and $n$ is 0, 1, 2 or 3, or Lewis acids of the formula $R_nMX_{x-n}$, wherein R is an alkyl, cycloalkyl, alkoxy or aryl group, these groups being optionally halogenated, X is a halogen or any other electronegative group such as, for example, SO$_3$F, and M is a metal atom, $x$ being advantageously the higher valence of the metal atom and $n$ having a value from 0 to $x$. It is preferred that such Lewis acids be used with a cocatalyst such as water, a Bronsted acid such as those hereabove mentioned, a metal halide, an organic halide or a mixture of several of these various cocatalysts.

The present invention relates more specifically to the Lewis acids whose metal is chosen from the Groups III, IV, and V of the periodic classification of the elements and is more particularly B, Al, Ga, In, Sn, Ti, Zr, P, As, Sb, Bi, V, Nb or Ta, the invention being however not limited to these groups since such compounds as, for example, $BeX_2$, $CuX_2$, $ZnX_2$, $CdX_2$, $HgX_2$, $FeX_3$, $MoX_6$, $WX_6$ and $UF_6$ are also very active in these catalyst compositions.

The most suitable halogen in these Lewis acids is fluorine and the metal fluorides which are used more advantageously are the following: $SbF_5$, $TaF_5$, $PF_5$, $NbF_5$, $BF_3$, $SnF_4$, $AlF_3$ and $TiF_4$. However the present invention is not limited to the metal fluorides since other metal halides such as, for instance, $AlCl_3$, $SnCl_4$ or $AlBr_3$, may also be used in solution in the sulfones in order to perform these conversions.

These metal halides may also be used in solution either alone or in association either with oxygen containing compounds such as ethers, ketones, alcohols, esters or nitro compounds, or with nitrogen containing compounds such as nitriles. The association of the Lewis acids with these compounds provides an improved solubility of the metal halides in said solvents and further, inasmuch as these compounds are not too basic, improve in some cases, the activity of the catalyst composition and the reaction selectivity.

The sulfones which may be used to dissolve said acid catalysts and thus form said new acid catalyst compositions are the sulfones of the general formula

R—SO$_2$—R′ wherein R and R′ are monovalent hydrocarbon radicals, each containing from 1 to 8 carbon atoms, particularly alkyl or aryl radicals, such as, for example, dimethylsulfone, di n-propylsulfone, diphenylsulfone and ethylmethylsulfone, and the alicyclic sulfones wherein the SO$_2$ group is inside a hydrocarbon ring. In such a case, R and R′ are forming together a branched or unbranched hydrocarbon divalent radical preferably containing from 3 to 12 carbon atoms. Among the latter, tetramethylene-sulfone or sulfolane, 3 methyl-sulfolane and 2,4-dimethylsulfolane are more particularly suitable since they offer the advantage of being liquid at room temperature. These sulfones may also have substituents, particularly one or more halogen atoms, such as for example, chloromethylethylsulfone. These sulfones may advantageously be used in the form of mixtures.

In the catalyst composition according to the invention, the acid concentration is advantageously between $10^{-5}$ moles per liter of sulfone and the concentration corresponding to the saturation without, however, exceeding 5 moles per liter of sulfone. The catalyst according to the invention may be used at temperatures between —20° C. and 200° C., and at pressures ranging from 0.1 to 200 atmospheres. When there is used a Lewis acid, in the presence of a cocatalyst, the molar ratio between the Lewis acid and the cocatalyst may vary beween 0.01/1. and 200/1. and preferably 0.1/1 and 10/1. It is advantageous to stir the reaction mixture.

It is desirable that the hydrocarbon feed be dehydrated, since the accumulation of water in the catalytic solution would result in the deactivation thereof.

In order to prevent such possible inconvenience, there can be dissolved in the catalytic solution a dehydrating agent such as, for example, phosphoric anhydride, which not only has no detrimental effect on the catalyst properties, but in some cases, improves them substantially.

EXAMPLE 1

A solution of 5 g. of 100% sulfuric acid in 250 g. of tetramethylenesulfone is heated up to 40° C. and stirred with a stirrer operated at 2,700 runs per minute. Isobutene is introduced continuously into the reactor at atmospheric pressure. The oligomers, as formed, progressively separate from the catalytic solution. After one hour the stirring is stopped and the oligomers settle in less than one minute. There are thus recovered 18 g. of oligomers. These oligomers contain 50% by weight of dimers and 30% by weight of trimers in addition to the dissolved isobutene.

EXAMPLES 2 TO 12

These examples relate to experiments which are carried out in the same conditions as in Example 1 except for the catalyst.

The catalysts consist of various metal halides associated with a cocatalyst which, according to the case, may be water, hydrofluoric acid or phosphoric acid. The results given in the following table show the influence of the metal halide, and, in the case of BF$_3$, of the cocatalyst on the catalytic activity of the tetramethylenesulfone solution. The obtained oligomers contain from 40 to 70% by weight of dimers and 20 to 40% by weight of trimers.

| Example number: | Metal halide | Cocatalyst | Concentration [1] | Oligomer, g./h./g. of metal halide |
|---|---|---|---|---|
| 2 | WF$_6$ | H$_2$O | 0.06 | 65 |
| 3 | SnCl$_4$ | HF | 0.2 | 72 |
| 4 | TiF$_4$ | HF | 0.2 | 140 |
| 5 | AlF$_3$ | HF | 0.1 | 270 |
| 6 | SnF$_4$ | HF | 0.05 | 290 |
| 7 | BF$_3$ | PO$_4$H$_3$ | 0.18 | 90 |
| 8 | BF$_3$ | H$_2$O | 0.01 | 350 |
| 9 | BF$_3$ | HF | 0.01 | 450 |
| 10 | TaF$_5$ | H$_2$O | 0.015 | 470 |
| 11 | PF$_5$ | HF | 0.1 | 600 |
| 12 | SbF$_5$ | HF | 0.005 | 4,800 |

[1] Molar concentration per liter of each of the catalyst elements (metal halide and catalyst).

EXAMPLE 13

A solution of 0.4 g. of BF$_3$—O(C$_2$H$_5$)$_2$ in 125 g. of tetramethylenesulfone is used under the same conditions as in the preceding examples. After one hour there are recovered 66 g. of oligomers containing 51% of dimers and 32% of trimers.

EXAMPLE 14

This example shows the influence of a third solvent on the selectivity to dimers in the oligomerization of isobutene. 80 cc. of tetramethylenesulfone containing $BF_3$ and HF at individual concentrations of $8.5 \times 10^{-3}$ moles per liter and 80 cc. of decahydronaphthalene containing 5 g. of isobutene are introduced into a reaction vessel. Both solutions are heated up to 40° C. and stirred with a stirrer operated at 2,500 runs per minute.

As a function of time there are observed the consumption of isobutene and the formation of dimers and trimers in the hydrocarbon phase. After one hour, the conversion rate of isobutene amounts to 45% and the molar ratio dimers/trimers is 16.

EXAMPLES 15, 16, 17

These examples show the possibility of using the catalyst compositions of this invention for selectively extracting tertiary olefins from a mixture of primary, secondary, and tertiary olefins. The present case is concerned with the extraction of isobutene from a steam cracking $C_4$ cut. The reaction is carried out under a total pressure of 4 kg./cm.$^2$, so as to maintain the $C_4$ cut in the liquid phase. The acid solution is tetramethylenesulfone and the $C_4$ cut are heated up to 40° C. and stirred with a stirrer operated at 1,800 runs per minute.

The ratio by liquid volume of the $C_4$ cut to the catalytic solution is 1. The composition of the $C_4$ cut in percent by weight is as follows: propane and propylene: 0.6%, isobutane: 1.7%, n-butane 5.6%, isobutene 53.1%, 1-butene: 29.1%, trans 2-butene: 5.1%, cis 2-butene: 3.2%, butadiene: 1.6%. The following table indicates the acid which has been dissolved into the sulfone and its concentration in moles per liter, the reaction time, the conversion rates of isobutene and of the three n-butenes, and finally the composition of the obtained oligomers free from volatile hydrocarbons.

at individual concentrations of 0.2 mole per liter, and the resulting mixture is heated up to 40° C. and stirred at 2,700 runs per minute. Propylene is continuously introduced at the atmospheric pressure. The propylene absorption velocity is substantially constant and equal to 0.15 mole per hour. After 3 hours, the stirring is discontinued and there are settled 16 g. of organic phase containing mono-, di-, tri-, and tetraisopropylbenzenes.

EXAMPLE 21

There are reacted in the same conditions as in Example 20, 150 g. of a mixture of tetramethylenesulfone and benzene (15 g.) containing antimony pentafluoride and hydrofluoric acid at the respective concentrations of 0.1 and 0.05 mole per liter. The propylene absorption velocity is 1.1 mole per hour. The organic phase which settles, contains mono-, di-, tri- and tetraisopropylbenzenes.

EXAMPLE 22

There are introduced 100 cc. of a solution of $BF_3$ and HF in sulfolane at the individual concentration of 0.1 mole per liter, and 10 g. of benzene, into a reaction vessel. The whole is heated up to 40° C. and stirred with a stirrer operated at 2,700 runs per minute. Propylene is introduced continuously at atmospheric pressure. The propylene absorption velocity is substantially constant and is equal to 0.15 mole per hour. After 2 hours, stirring is discontinued and there are settled 11 g. of hydrocarbon products, containing 18% by weight of propylene oligomers and 82% of compounds containing the benzene

| | | | | Composition of the gasoline | |
|---|---|---|---|---|---|
| Example No. | Catalyst and concentration (mol. liter$^{-1}$) | Reaction times in hours | Conversion rate, percent | Dimers, percent by weight | Trimers, percent by weight |
| 15 | BF$_3$ 0.006<br>HF 0.006 | 5.0 | Isobutene 78<br>n-Butenes 1.8 | 83 | 12 |
| 16 | BF$_3$ 0.03<br>HF 0.02 | 0.5 | Isobutene 91.4<br>n-Butenes 5.2 | 64 | 18 |
| 17 | SbF$_5$ 0.0025<br>HF 0.0035 | 2.0 | Isobutene 95<br>n-Butenes 5.5 | 67 | 24 |

EXAMPLE 18

This example relates to the alkylation of isobutane by means of 2-butene.

200 cc. of tetramethylenesulfone containing boron trifluoride, hydrofluoric acid and phosphoric anhydride at respective concentrations of 0.5, 0.5 and 0.05 mole per liter and 200 cc. of a liquid mixture of isobutane and 2-butene, wherein the molar ratio isobutane/2-butene is 10, have been introduced into a reaction vessel. The reaction is carried out at 40° C., under a pressure of 5 kg./cm.$^2$ and with a stirrer operated at 2,300 runs per minte, 2-butene is reacted until complete conversion thereof, which takes a few hours. The hydrocarbon phase is withdrawn and distilled so as to separate the unreacted isobutane and the hydrocarbons which distill below 40° C. The obtained alkylated amount corresponds to a yield by weight of 148% with respect to the supplied 2-butene.

EXAMPLE 19

The same experiment as in the preceding example is carried out except that $BF_3$ is replaced by $SbF_5$. The reaction progresses more rapidly. The yield by weight of the obtained alkylate is 130%.

EXAMPLE 20

This example relates to the alkylation of benzene by means of propylene. There are introduced into a reactor 150 g. of a mixture of tetramethylenesulfone and benzene (15 g.) containing boron trifluoride and phosphoric acid ring. The composition of the aromatic products, obtained by chromatographic determination, is as follows:

Percent, mole
Benzene _____ 60
Cumene _____ 26
Diisopropylbenzenes _____ 9.3
Triisopropylbenzenes _____ 4.0
Tetraisopropylbenzenes _____ 0.7

The molar selectivity of cumene with respect to the consumed propylene, calculated by taking into account the products remaining in the catalytic phase, is 20%.

EXAMPLE 23

There are introduced 50 cc. of a solution of $BF_3$ and HF in sulfolane at the respective concentrations of 1.5 and 2.5 mole per liter and a mixture of 39 g. of benzene and 16.8 g. of 1-dodecene into a reaction vessel. The reaction is conducted at 40° C. and at atmospheric pressure. The whole mixture is emulsified by means of a stirrer operated at 2,700 runs per minute. After 2 hours of reaction, stirring is discontinued. The hydrocarbon supernatant phase is withdrawn. The same operation is repeated twice (there are introduced at each time 39 g. of benzene and 16.8 g. of 1-dodecene) by using the same catalytic phase. The dodecene conversion rate calculated from chromatographic determination for each of the three successive runs is respectively 98, 97 and 95%. The three hydrocarbon phases are collected, washed, dried and distilled. There are recovered 1.8 g. of dodecene, 62 g. of monododecylbenzene and 4.5 g. of heavy products containing didodecylbenzenes and dodecene dimers.

The 2-phenyl-dodecane content of the phenyldodecanes is 35%. The molar selectivity to monododecylbenzene with respect to the converted dodecene is 87%.

EXAMPLE 24

50 cc. of a solution of $SbF_5$ and HF in sulfolane at individual concentrations of 0.1 mole per liter, and a mixture of 23.4 g. of benzene and 16.8 g. of 1-dodecene are introduced into a reaction vessel. The reaction is conducted at 70° C. and at the atmospheric pressure with the use of a stirrer operated at 2,700 runs per minute. After 2 hours of reaction, stirring is discontinued and the settled hydrocarbon phase is withdrawn. This operation is repeated once more by using the same catalytic phase. The dodecene conversion rates estimated by chromatographic determination for both runs are respectively 95 and 90%. The two hydrocarbon phases are collected together, washed, dried and distilled. There are recovered 2.7 g. of dodecene, 34.4 g. of monododecylbenzene and 5.1 g. of heavy products containing didodecylbenzenes and dodecene dimers. The 2-phenyl-dodecane content of the phenyldodecenes is 32%. The molar selectivity to monododecylbenzene with respect to the converted dodecene is 76%.

From the foregoing description, one skilled in the art can easily ascertain the essential characteristics of this invention and, without departing from the spirit and scope thereof, can make various changes and modifications of the invention to adapt it to various usages and conditions. Consequently such changes and modifications are properly, equitably and intended to be within the full range of equivalence of the following claims.

What we claim as this invention is:

1. In an alkylation process which comprises reacting an olefin with an aliphatic or aromatic hydrocarbon in the presence of a catalyst, the improvement which comprises employing as said catalyst, a liquid catalyst containing
    (a) an acid catalyst selected from the group consisting of the Lewis acids and the Bronsted acids, and
    (b) a sulfone of formula R—$SO_2$—R', wherein R and R', taken separately, are hydrocarbon monovalent radicals containing from 1 to 8 carbon atoms and, taken together, form a hydrocarbon divalent radical containing from 3 to 12 carbon atoms, the acid catalyst concentration being between $10^{-5}$ moles per liter of sulfone and the concentration corresponding to the saturation, without exceeding 5 moles per liter.

2. A process according to claim 1, said catalyst composition further comprising an inert hydrocarbon solvent.

3. A process according to claim 1, wherein the Bronsted acid is selected from the group consisting of sulfuric acid, fluorosulfuric acid, a sulfonic acid, a hydrogen halide, an acid of the formula:

$$X_nPO_2H(PO)_{2-n}$$

wherein X is a halogen, R is a hydrogen atom or an alkyl group and $n$ is selected from 0, 1 and 2, and an acid of the formula:

$$CX_nH_{3-n}COOH$$

wherein X is a halogen and $n$ is selected from 0, 1, 2 and 3.

4. A process acording to claim 1, wherein the acid catalyst is a Lewis acid of the formula:

$$R_nMX_{x-n}$$

wherein R is selected from the group consisting of the alkyl, cycloalkyl, alkoxy and aryl radicals and the corresponding halogenated radicals, X is halogen or $SO_3F$, M is a metal selected from Groups III, IV or V of the periodic classification and $n$ is an integer from 0 to $x$, $x$ being the higher valence of said metal.

5. A process according to claim 1, wherein the acid catalyst is a Lewis acid, the catalyst composition further containing a cocatalyst compared selected from the group consisting of water and a Bronsted acid, and mixtures thereof, the molar ratio of Lewis acid to cocatalyst being 0.01:1 to 200:1.

6. A process according to claim 1, wherein the Lewis acid is used together with a compound selected from the group consisting of an ether, ketone, alcohol, ester, nitro compound and nitrile.

7. A process according to claim 5, wherein the molar ratio of the Lewis acid to the cocatalyst is between 0.1/1. and 10/1.

8. A process according to claim 1, said process comprising alkylating an aromatic hydrocarbon with an olefin of 9–15 carbon atoms.

9. A process according to claim 1, comprising alkylating benzene with dodecene.

10. A process according to claim 4, said process comprising alkylating an aromatic hydrocarbon with an olefin of 9–15 carbon atoms.

References Cited
UNITED STATES PATENTS

| | | | |
|---|---|---|---|
| 3,363,018 | 1/1968 | Cahill et al. | 260—671 B |
| 3,666,825 | 5/1972 | Torck et al. | 260—671 C |
| 3,678,120 | 7/1972 | Bloch | 260—671 C |

CURTIS R. DAVIS, Primary Examiner

U.S. Cl. X.R.

260—671 B, 683.47, 683.48, 683.63, 683.64